(12) United States Patent
Song et al.

(10) Patent No.: US 9,715,716 B2
(45) Date of Patent: Jul. 25, 2017

(54) DATA PROCESSING APPARATUS FOR ORGANIC LIGHT EMITTING DISPLAY DEVICE

(71) Applicant: LG Display Co., Ltd., Seoul (KR)

(72) Inventors: JiHee Song, Paju-si (KR); EuiYeol Oh, Seoul (KR); JooYong Lee, Changwon-si (KR)

(73) Assignee: LG Display Co., Ltd., Seoul (KR)

( * ) Notice: Subject to any disclaimer, the term of this patent is extended or adjusted under 35 U.S.C. 154(b) by 94 days.

(21) Appl. No.: 14/739,843

(22) Filed: Jun. 15, 2015

(65) Prior Publication Data
US 2015/0379683 A1 Dec. 31, 2015

(30) Foreign Application Priority Data
Jun. 26, 2014 (KR) ........................ 10-2014-0079168

(51) Int. Cl.
| | | |
|---|---|---|
| G06F 13/00 | (2006.01) | |
| G06T 1/60 | (2006.01) | |
| G09G 3/3208 | (2016.01) | |
| G06T 1/20 | (2006.01) | |

(52) U.S. Cl.
CPC ................. *G06T 1/60* (2013.01); *G06T 1/20* (2013.01); *G09G 3/3208* (2013.01); *G09G 2320/045* (2013.01)

(58) Field of Classification Search
CPC .......... G09G 2340/00; G09G 2340/02; G09G 2340/004; G06T 1/60; G06T 9/00; G06T 9/004; G06T 9/005; G06T 9/007; G06T 9/008

USPC ........ 345/530, 536, 537, 538, 555, 566, 567
See application file for complete search history.

(56) References Cited

U.S. PATENT DOCUMENTS

| | | | | |
|---|---|---|---|---|
| 5,748,904 A | * | 5/1998 | Huang | .................... G06T 9/005 345/544 |
| 5,848,217 A | * | 12/1998 | Tsukagoshi | .......... G11B 27/005 385/95 |
| 5,990,920 A | | 11/1999 | Nagumo et al. | |
| 6,301,304 B1 | * | 10/2001 | Jing | ....................... H04N 19/61 375/240.25 |
| 8,804,824 B1 | * | 8/2014 | Linzer | .................... H04N 19/50 375/240.02 |
| 2007/0160302 A1 | * | 7/2007 | Han | ...................... H04N 19/176 382/240 |
| 2007/0183505 A1 | * | 8/2007 | Shimizu | ................. H04N 19/52 375/240.16 |
| 2009/0066719 A1 | * | 3/2009 | Combes | ............... G09G 3/2051 345/596 |

(Continued)

FOREIGN PATENT DOCUMENTS

| | | |
|---|---|---|
| EP | 2 094 018 A1 | 8/2009 |
| JP | 2001-045480 A | 2/2001 |

OTHER PUBLICATIONS

European Patent Office, Search Report and Opinion, European Patent Application No. 15172653.6, Aug. 3, 2015, nine pages.

*Primary Examiner* — Xiao Wu
*Assistant Examiner* — Sarah Lhymn
(74) *Attorney, Agent, or Firm* — Fenwick & West LLP

(57) ABSTRACT

Provided is a data processing apparatus of an organic light emitting display device, which performs encoding and decoding through different schemes according to frequency components and data components, thereby preventing loss of a high frequency component included in data.

20 Claims, 11 Drawing Sheets

(56) References Cited

U.S. PATENT DOCUMENTS

| | | | |
|---|---|---|---|
| 2009/0087111 A1* | 4/2009 | Noda | H04N 21/23892 382/238 |
| 2009/0295422 A1* | 12/2009 | Hamer | G09G 3/3233 324/760.02 |
| 2010/0080296 A1* | 4/2010 | Lee | H04N 19/52 375/240.16 |
| 2010/0220788 A1* | 9/2010 | Wittmann | H04N 19/00587 375/240.16 |
| 2011/0004469 A1* | 1/2011 | Sato | G10L 19/07 704/219 |
| 2011/0032264 A1* | 2/2011 | Ietomi | G09G 3/3233 345/559 |
| 2012/0082217 A1* | 4/2012 | Haskell | H04N 19/176 375/240.12 |
| 2013/0101028 A1* | 4/2013 | Fukui | G10L 19/038 375/240.03 |

* cited by examiner

| 34 | 34 | 34 | 34 | 34 | 34 | 34 | 34 |

| 2 | 1 | 2 | 0 | 2 | 4 | 3 | 29 |

| 0 | 1 | 1 | 1 | 0 | 1 |

| 1 | 1 | 1 | 1 | 0 | 1 |

FIG. 12A
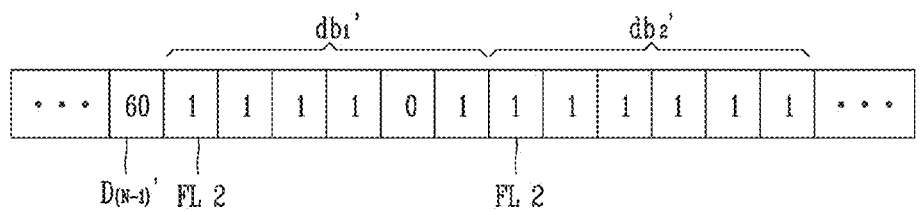
FIG. 12B
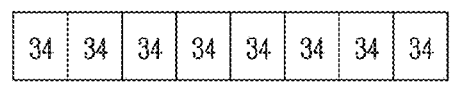
FIG. 12C
34 -----------------------------------------------------------------
FIG. 12D
FIG. 12E
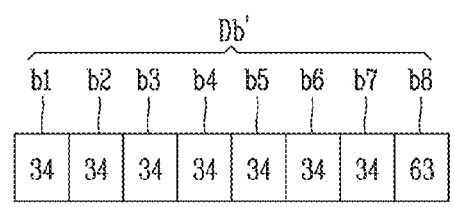

DATA PROCESSING APPARATUS FOR ORGANIC LIGHT EMITTING DISPLAY DEVICE

CROSS-REFERENCE TO RELATED APPLICATION

Pursuant to 35 U.S.C. §119(a), this application claims the benefit of earlier filing date and right of priority to Korean Patent Application No. 10-2014-0079168, filed on Jun. 26, 2014, the contents of which is incorporated by reference herein in its entirety.

BACKGROUND OF THE INVENTION

1. Field of the Invention

The present disclosure relates to an organic light emitting display device, and particularly, to a data processing device performing encoding and decoding on data in consideration of compensation data characteristics of an organic light emitting display device.

2. Background of the Invention

Various flat panel display devices with reduced size and weight, overcoming the shortcomings of cathode ray tubes (CRTs) have emerged. Flat panel display devices include a liquid crystal display (LCD), a field emission display (FED), a plasma display panel (PDP), an organic light emitting display device, and the like.

Among them, organic light emitting display devices display an image using an organic light emitting diode (OLED) generating light according to hole-electron recombination. Organic light emitting display devices do not need a separate light source, yet still have characteristics such as low power consumption, high luminance, fast response speed, and the like, and thus, organic light emitting display devices have been widely applied.

However, an organic light emitting display device has a problem in that luminance of a displayed image is reduced due to non-uniformity of mobility due to a degradation of driving transistors driving an OLED. As a solution, a method of providing a compensation unit in a driving circuit unit of the organic light emitting display device and compensating for mobility using compensation data stored in the compensation unit has been proposed.

Mobility compensation data is generated to have gray levels from 0 to 63. Initial mobility compensation data is stored in a flash memory of the organic light emitting display device. While the organic light emitting display device is in operation, the initial mobility compensation data is transmitted to a memory of the compensation unit, and the compensation unit compensates for mobility of the driving transistor in real time.

Here, the mobility compensation data includes eight data blocks and are transmitted from the flash memory to the memory of the compensation unit. Each of the data blocks has a value of 6-bit data expressed by a decimal number. Because single mobility compensation data is formed as 48-bit data, the flash memory and the memory of the compensation unit need to have a size sufficient for storing the 48-bit data. Thus, in order to reduce the size of the memories, a method for encoding mobility compensation data and transmitting the encoded data has been proposed.

FIG. 1 is a flow chart illustrating a general method for encoding and decoding data.

As illustrated in FIG. 1, in the related art data encoding, a representative value is extracted from transmitted data (S10), and encoding is performed through data sampling using the extracted representative value (S20). The encoded data is decoded to the original data through interpolation or the like (S30).

However, the mobility compensation data of the organic light emitting display device has a high frequency of a peak component therein. When the mobility compensation data is encoded and decoded using the related art data encoding and decoding method, a high frequency component of the mobility compensation data may be lost.

SUMMARY OF THE INVENTION

Therefore, an aspect of the detailed description is to provide a data processing apparatus of an organic light emitting display device, capable of encoding and decoding compensation data without loss of a high frequency component.

To achieve these and other advantages and in accordance with the purpose of this specification, as embodied and broadly described herein, a data processing apparatus may include: a first memory configured to store compensation data; a data encoding unit configured to classify the compensation data transmitted from the first memory according to frequency components and encode the classified compensation data; a second memory configured to store encoded data transmitted from the data encoding unit; and a data decoding unit configured to classify the encoded data transmitted from the second memory according to data components and decompress the classified encoded data.

According to the data processing apparatus of an organic light emitting display device, since compensation data is encoded through different encoding methods according to frequency components of the compensation data and the encoded data are decoded through different decoding methods according to data components of the encoded data, whereby data encoding and decoding may be performed without losing a high frequency component included in the compensation data.

Also, since the memory provided in the compensation unit of the organic light emitting display device stores the encoded compensation data, the number of memories may be reduced, thus manufacturing cost of the organic light emitting display device may be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

FIGS. 12A through 12E are views illustrating an operation of a high frequency decoding unit according to another embodiment of the present disclosure.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a data processing apparatus of an organic light emitting display device according to an embodiment of the present invention will be described in detail with reference to the accompanying drawings.

Figure 1:
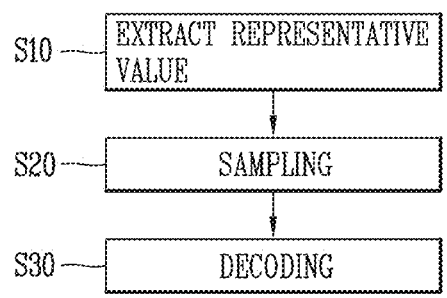
FIG. 1 is a flow chart illustrating a general data encoding and decoding method.
Figure 2:
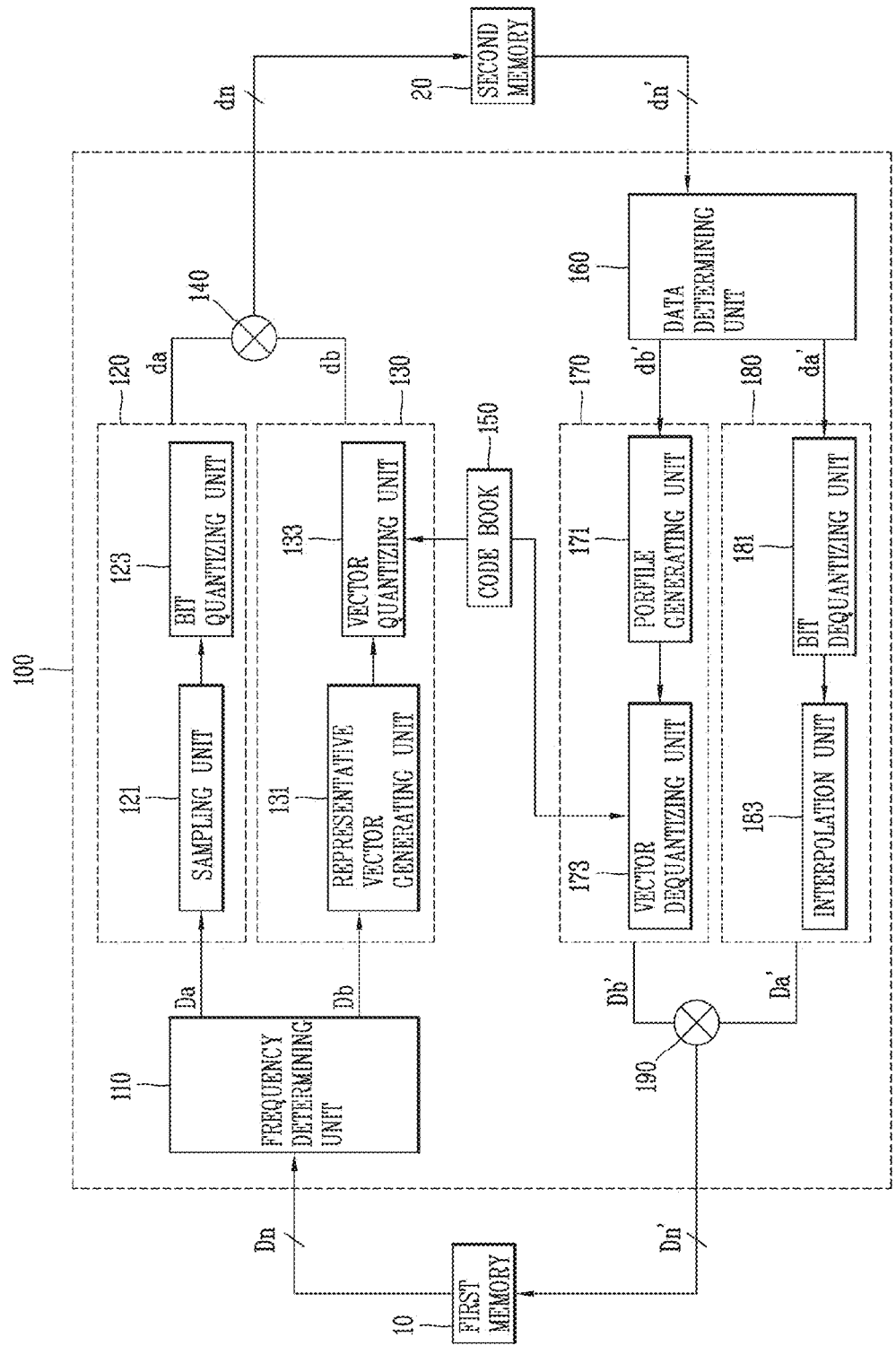
FIG. 2 is a view illustrating a configuration of a data processing apparatus according to an embodiment of the present disclosure.

FIG. 2 is a view illustrating a configuration of a data processing apparatus according to an embodiment of the present disclosure.

Referring to FIG. 2, the data processing apparatus 100 according to an embodiment of the present disclosure may encode compensation data Dn transmitted from a first memory 10 and transmit the encoded data to a second memory 20. Also, the data processing apparatus 100 may decompress encoded data dn' from the second memory 20 and transmit the decoded data to the first memory 10.

The first memory 10 may be a flash memory provided in a driving circuit unit (not shown) of an organic light emitting display device. The compensation data Dn, for example, initial compensation data, may be stored in the first memory 10. When the organic light emitting display device is turned on, the first memory 10 may output the stored compensation data Dn to the data processing apparatus 100. Also, when the organic light emitting display device is turned off, the first memory 10 may receive decoded data Dn' from the data processing apparatus 100 and update compensation data Dn using the decoded data Dn'.

The second memory 20 may be an internal memory of a compensation unit, for example, mobility compensation unit, provided in the driving circuit unit of the organic light emitting display device. Encoded data dn transmitted from the data processing apparatus 100 may be stored in the second memory 20. When the organic light emitting display device is turned on, the second memory 20 may receive the encoded data dn from the data processing apparatus 100 and store the received encoded data dn. While the organic light emitting display device is in the turned-on state, the mobility compensation unit may perform mobility compensation using the encoded data dn stored in the second memory 20. While the mobility compensation unit is in operation, the second memory 20 may update the stored encoded data dn. When the organic light emitting display device is turned off, the second memory 20 may output the stored encoded data dn, for example, the updated encoded data, to the data processing apparatus 100.

That is, when the organic light emitting display device is turned on, the data processing apparatus 100 according to an embodiment of the present disclosure may perform encoding on the compensation data Dn, and when the organic light emitting display device is turned off, the data processing apparatus 100 may perform restoration on the encoded data dn.

The data processing apparatus 100 may include an encoding module including a frequency determining unit 110, data encoding units 120 and 130, and a first output unit 140. Also, the data processing apparatus 100 may include a decoding module including a data determining unit 160, data decoding units 170 and 180, and a second output unit 190.

Figure 3:
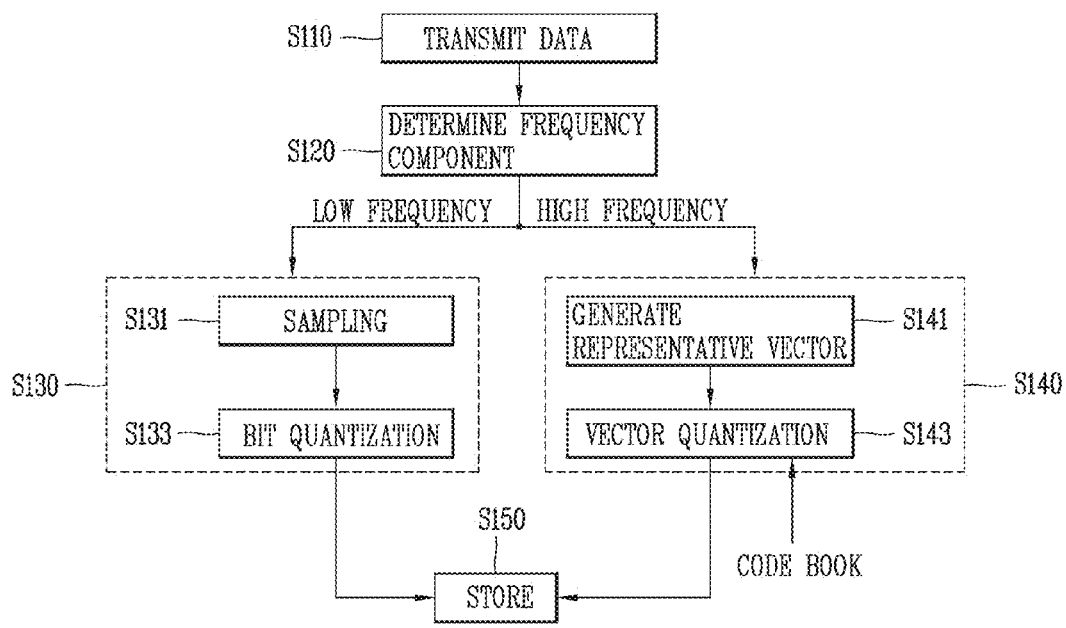
FIG. 3 is a flow chart illustrating a compensation data encoding operation of the data processing apparatus illustrated in FIG. 2.

FIG. 3 is a flow chart illustrating a compensation data encoding operation of the data processing apparatus illustrated in FIG. 2. Hereinafter, the encoding module of the data processing apparatus 100, and an operation thereof will be described in detail with reference to FIGS. 2 and 3.

Referring to FIGS. 2 and 3, the compensation data Dn may be transmitted from the first memory 10 to the data processing apparatus 100 (S110). The frequency determining unit 110 may determine a frequency component of the transmitted compensation data Dn (S120).

The frequency determining unit 110 may classify the compensation data Dn into low frequency region compensation data Da or high frequency region compensation data Db.

In general, the compensation data Dn for compensating for mobility of the organic light emitting display device includes a high frequency of a peak component therein. The frequency determining unit 110 may determine whether a high frequency component exists in the compensation data Dn and classify the compensation data Dn into a low frequency region compensation data Da or the high frequency region compensation data Db.

Figure 4:
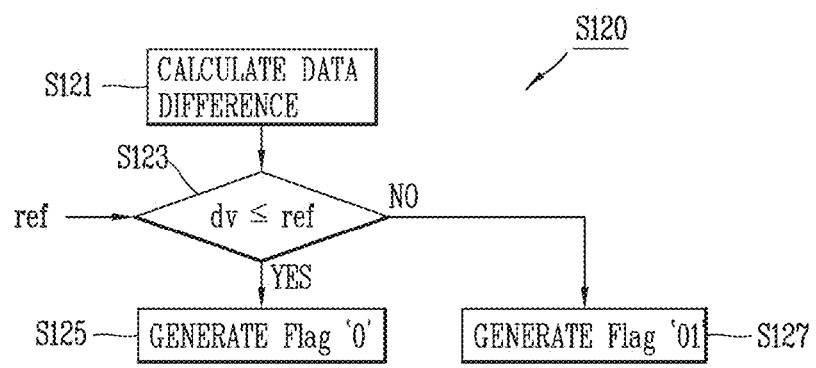
FIG. 4 is a flow chart illustrating an operation of a frequency determining unit.
Figure 5A:
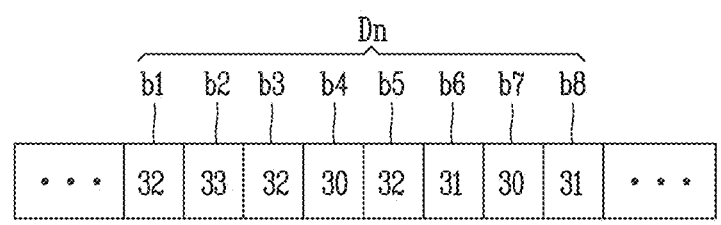
FIGS. 5A through 5B are views illustrating an operation of a frequency determining unit according to an embodiment of the present disclosure.
Figure 5B:
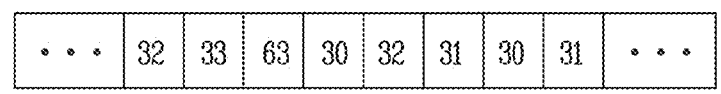

FIG. 4 is a flow chart illustrating an operation of a frequency determining unit, and FIGS. 5A through 5B are views illustrating an operation of a frequency determining unit according to an embodiment of the present disclosure.

Referring to FIGS. 5A through 5B, the compensation data Dn may include eight data blocks b1 to b8 each having gray levels from 0 to 63. Each of the data blocks b1 to b8 is 6-bit data which can be expressed by a decimal number. Thus, the compensation data Dn may be configured as 48-bit data.

Referring to FIGS. 2 and 4, the frequency determining unit 110 may calculate a data difference dv from the input compensation data Dn (S121). The frequency determining unit 110 may calculate data differences dv between adjacent data blocks among the plurality of data blocks b1 to b8 of the compensation data Dn.

Referring to FIG. 5A, when the compensation data Dn is input as data of 32, 33, 32, 30, 32, 31, 30, and 31, the frequency determining unit 110 may calculate data differences dv between the adjacent data, as 1, 1, 2, 2, 1, 1, 1.

In other words, the frequency determining unit 110 calculates data differences dv between the first and second data blocks b1 and b2, between second and third data blocks b2 and b3, between third and fourth data blocks b3 and b4, between fourth and fifth data blocks b4 and b5, between fifth and sixth data blocks b5 and b6, between sixth and seventh data blocks b6 and b7, and between seventh and eighth data blocks b7 and b8.

Also, referring to FIG. 5B, when the compensation data Dn is input as data of 32, 33, 63, 30, 32, 31, 30, 31, the frequency determining unit 110 may calculate data differences dv between adjacent data of the compensation data Dn, as 1, 30, 33, 2, 1, 1, 1 according to the method described above.

The frequency determining unit 110 may compare the data differences dv calculated from the compensation data Dn with a reference value ref (S123). The reference value ref may be a preset value. In this embodiment, a case where the reference value ref is 30 will be described as an example, but the present disclosure is not limited thereto.

When the data differences dv are smaller than or equal to the reference value ref according to the result of comparison between the data difference dv and the reference value ref, the frequency determining unit 110 may classify the compensation data Dn as low frequency region compensation data Da. According to the classification, the frequency determining unit 110 may generate a 1-bit flag signal, for example, 0, as a low frequency flag bit (S125).

As illustrated in FIG. 5A, when data differences dv of the compensation data Dn are 1, 1, 2, 2, 1, 1, 1, all the values of the data differences dv are smaller than the reference value ref. Thus, the frequency determining unit 110 may classify the compensation data Dn as low frequency region compensation data Da and generate a low frequency flag bit 0.

Also, when the data differences dv are greater than the reference value ref according to a result of comparison between the data differences dv and the reference value ref, the frequency determining unit 110 may classify the compensation data Dn as a high frequency region compensation data Db. The frequency determining unit 110 may generate a 1-bit flag signal, for example, 1, as a high frequency flag bit according to the classification (S127).

As illustrated in FIG. 5B, when data differences dv of the compensation data Dn are 1, 30, 33, 2, 1, 1, 1, the data difference value 33, among the values of the data differences dv, is greater than the reference value ref. Thus, the frequency determining unit 110 may classify the compensation data Dn as a high frequency region compensation data Db and generate a high frequency flag bit 1.

In this manner, by detecting a high frequency present as a peak component in the compensation data Dn by calculating differences between adjacent data, the frequency determining unit 110 may classify the compensation data Dn as low frequency region data or high frequency region data.

Referring back to FIGS. 2 and 3, the data encoding units 120 and 130 may include a low frequency encoding unit 120 and a high frequency encoding unit 130.

The low frequency encoding unit 120 may include a sampling unit 121 and a bit quantization unit 123. The low frequency encoding unit 120 may encode the low frequency region compensation data Da classified by the frequency determining unit 110 and output the same (S130).

FIG. 6A through 6D are views illustrating an operation of the low frequency encoding unit according to an embodiment of the present disclosure.

Figure 6A:
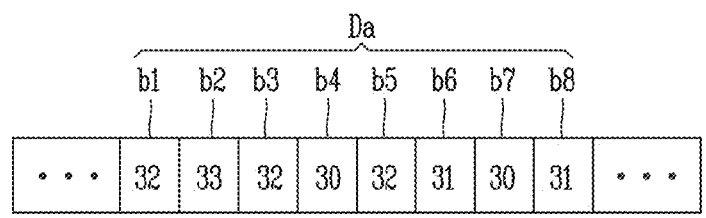
FIGS. 6A through 6D are views illustrating an operation of a low frequency encoding unit according to an embodiment of the present disclosure.

Referring to FIGS. 2, 3, and 6A to 6D, the low frequency region compensation data Da classified by the frequency determining unit 110 may be input to the sampling unit 121 of the low frequency encoding unit 120. The low frequency region compensation data Da may be data of 32, 33, 32, 30, 32, 31, 30, 31 as illustrated in FIG. 6A.

The sampling unit 121 may sample the low frequency region compensation data DA and output a plurality of intermediate data (S131).

The sampling unit 121 may extract a representative value from the input low frequency region compensation data Da. The representative value may be extracted as a maximum value, for example, 33, among the plurality of data of the low frequency region compensation data Da, but the present invention is not limited thereto. The sampling unit 121 may extract first data of the low frequency region compensation data Da as the representative value.

Figure 6B:
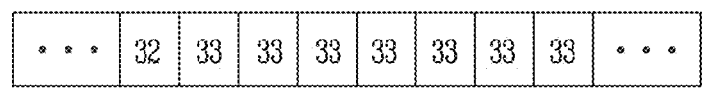

Also, the sampling unit 121 may generate intermediate data having eight data blocks, each data block including the extracted representative value 33 as illustrated in FIG. 6B.

Figure 6C:
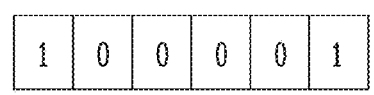

The bit quantization unit 123 may quantize the intermediate data generated by the sampling unit 121 to generate low frequency encoded data da (S133). The bit quantization unit 123 may quantize one of a plurality of data of the intermediate data, for example, 33, and generate N-bit data, i.e., 6-bit data of 100001 as illustrated in FIG. 6C.

Figure 6D:
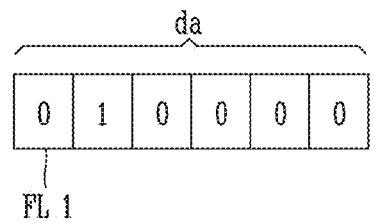

As illustrated in FIG. 6D, the bit quantization unit 123 may remove the least significant bit (LSB) of the generated 6-bit data and subsequently add a low frequency flag, that is, 0, generated by the frequency determining unit 110 to a front end of a most significant bit (MSB) to generate low frequency encoded data (da) 010000.

Referring back to FIGS. 2 and 3, the high frequency encoding unit 130 may include a representative vector generating unit 131 and a vector quantizing unit 133. The high frequency encoding unit 130 may encode the high frequency region compensation data Db classified by the frequency determining unit 110 and output the same (S140).

FIGS. 7A through 7F are views illustrating an operation of a high frequency encoding unit according to an embodiment of the present disclosure, and FIGS. 8A through 8F are views illustrating an operation of a high frequency encoding unit according to another embodiment of the present disclosure.

Figure 7A:
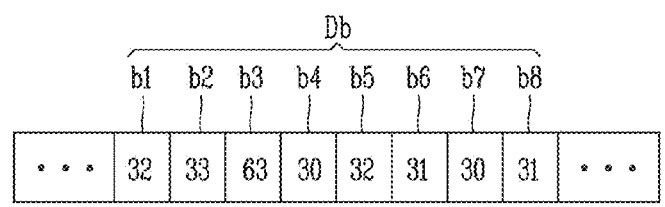
FIGS. 7A through 7F are views illustrating an operation of a high frequency encoding unit according to an embodiment of the present disclosure.

Referring to FIGS. 2, 3, and 7A through 7F, the high frequency region compensation data Db classified by the frequency determining unit 110 may be input to the representative vector generating unit 131 of the high frequency encoding unit 130. The high frequency region compensation data Db may be data of 32, 33, 63, 30, 32, 31, 30, 31 as illustrated in FIG. 7A.

The representative vector generating unit 131 may generate a representative vector from the high frequency region compensation data Db (S141).

The representative vector generating unit 131 may extract a representative value from the high frequency region compensation data Db to generate intermediate data. The representative vector generating unit 131 may extract a representative value through various methods according to positions of the high frequency data among the plurality of data of the high frequency region compensation data Db.

For example, as illustrated in FIG. 7A, among the plurality of data of the high frequency region compensation data Db, high frequency data 63 may be positioned at a middle of the high frequency region compensation data Db or at a portion of the high frequency region compensation data Db excluding the both ends. Thus, the representative vector generating unit 131 may extract first data 32 as a representative value, among the plurality of data of the high frequency region compensation data Db.

Figure 7B:
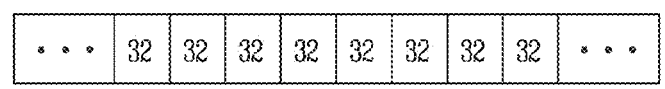

Subsequently, as illustrated in FIG. 7B, the representative vector generating unit 131 may generate intermediate data having eight data blocks using the extracted representative value 32.

Figures 8A, 8B, 8C, 8D, 8E, 8F:
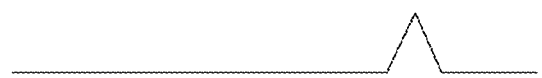
FIGS. 8A through 8F are views illustrating an operation of a high frequency encoding unit according to another embodiment of the present disclosure.

Also, as illustrated in FIG. 8A, among the plurality of data of the high frequency region compensation data Db, high frequency data 63 may be positioned at the end of the high frequency region compensation data Db. Thus, the representative vector generating unit 131 may extract a moving average value 34 as a representative value of the high frequency region compensation data Db. Here, the moving average value may be an average value of a plurality of previous encoding data encoded by the data encoding units 120 and 130 in a previous point in time, for example, before the high frequency region compensation data Db was encoded.

As illustrated in FIG. 8C, the representative vector generating unit 131 may generate intermediate data having eight data blocks using the extracted representative value 34.

The representative vector generating unit 131 may generate a representative vector using the high frequency compensation data Db and the intermediate data. The representative vector generating unit 131 may generate a representative vector profile from the generated representative vector.

Figure 7C:
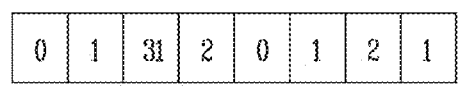

As illustrated in FIG. 7C, the representative vector generating unit 131 may generate a representative vector 0, 1, 31, 2, 0, 1, 2, 1 according to a difference between the high frequency region compensation data Db and the intermediate data.

Figure 7D:

Subsequently, as illustrated in FIG. 7D, the representative vector generating unit 131 may generate a representative vector profile from the representative vector. The representative vector profile may be expressed as a graph having a predetermined peak amplitude in the position of the high frequency component, that is, in the position of 31, in the representative vector.

Also, as illustrated in FIG. 8C, the representative vector generating unit 131 may generate a representative vector 2, 1, 2, 0, 2, 4, 3, 29 according to differences between the high frequency region compensation data Db and the intermediate data.

Subsequently, as illustrated in FIG. 8D, the representative vector generating unit 131 may generate a representative profile from the representative vectors. The representative vector profile may be expressed as a graph having a predetermined peak amplitude in a position of the high frequency component, that is, in the position of 29, in the representative vector.

The vector quantizing unit 133 may generate high frequency encoded data db from the representative vector profile generated by the representative vector generating unit 131 through quantization (S143).

The data processing apparatus 100 according to this embodiment may further include a code book 150 in which a plurality of vector profiles and a plurality of indices corresponding thereto. The plurality of vector profiles stored in the code book 150 may be graphs having predetermined peak amplitudes appearing in different positions. The indices may be data values according to the peak amplitudes, for example, data values having levels from 0 to 63, in the graphs of the vector profiles.

The vector quantizing unit 133 may detect one vector profile corresponding to the representative vector profile generated by the representative vector generating unit 131 from the plurality of vector profiles stored in the code book 150. The vector quantizing unit 133 may extract an index corresponding to the one vector profile detected from the code book 150. The vector quantizing unit 133 may generate N (N is a natural number)-bit data from the extracted index.

For example, the vector quantizing unit 133 may detect a vector profile corresponding to the representative vector profile illustrated in FIG. 7D, from the code book 150, and extract an index, for example, 31, corresponding to the detected vector profile.

Figure 7E:
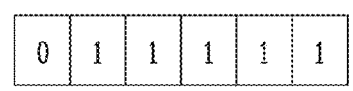

Subsequently, as illustrated in FIG. 7E, the vector quantizing unit 133 may generate 6-bit data 011111 from the extracted index 31.

Figure 7F:
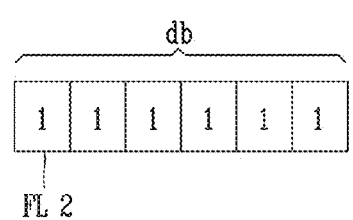

Thereafter, as illustrated in FIG. 7F, the vector quantizing unit 133 may replace the MSB of the generated 6-bit data with the high frequency flag, that is, 1, generated by the frequency determining unit 110 to generate 6-bit high frequency encoded data db 111111.

Also, the vector quantizing unit 133 may detect a vector profile corresponding to the representative vector profile illustrated in FIG. 8D, and extract an index, for example, 29, corresponding to the detected vector profile.

Subsequently, as illustrated in FIG. 8E, the vector quantizing unit 133 may generate 6-bit data 011101 from the extracted index 29.

Thereafter, as illustrated in FIG. 8F, the vector quantizing unit 133 may replace the MSB of the generated 6-bit data with the high frequency flag, that is, 1, generated by the frequency determining unit 110 to generate 6-bit high frequency encoded data db 111101.

That is, the encoding module of the data processing apparatus 100 may classify 48-bit compensation data Dn input from the first memory 10 according to frequency components, and may encode the classified compensation data Dn through separate encoding units, that is, the low frequency encoding unit 120 and the high frequency encoding unit 130, respectively, to generate 6-bit encoded data, for example, the low frequency encoded data da and the high frequency encoded data db.

The first output unit 140 of the encoding module may output at least one of the low frequency encoded data da and the high frequency encoded data db, as encoded data dn. The output encoded data dn may be stored in the second memory 20 (S150).

As described above, in the data processing apparatus 100 according to an embodiment of the present disclosure, since the compensation data Dn is encoded by selecting one of low frequency encoding and high frequency encoding according to a frequency component, data encoding may be performed without losing the high frequency component included in the compensation data Dn. Also, since the second memory 20 stores the encoded compensation data, rather than the original compensation data, the number and capacity of the second memory 20 may be reduced, compared with the related art organic light emitting display device.

Figure 9:
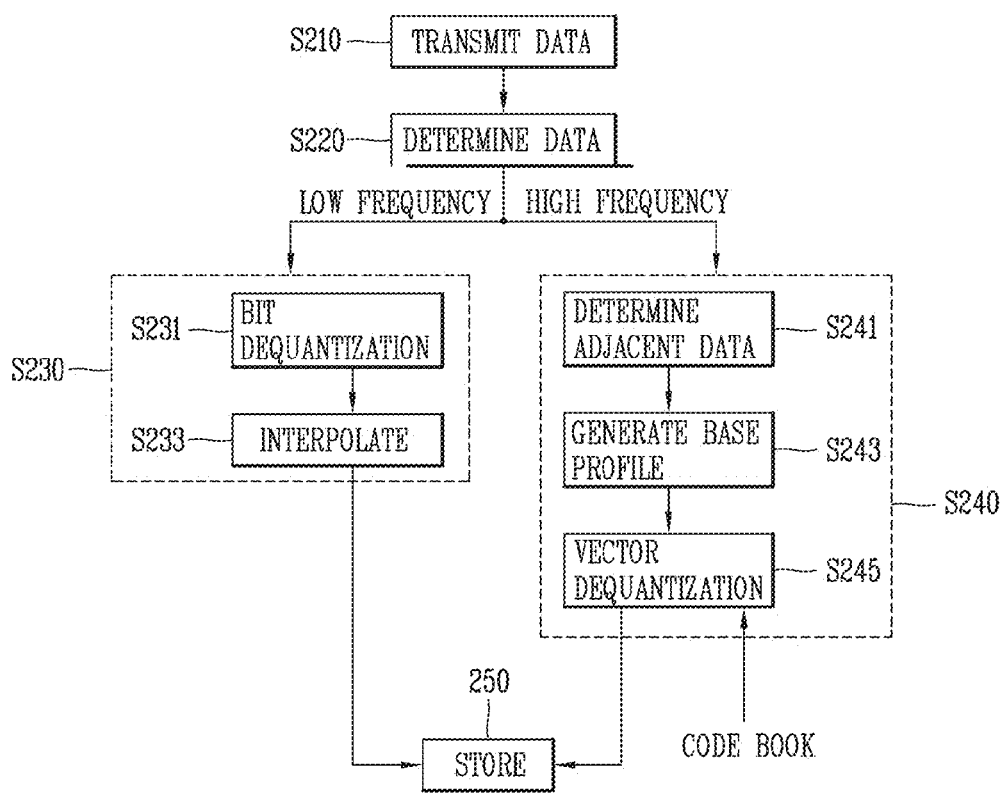
FIG. 9 is a flow chart illustrating an operation of decoding encoded data by the data processing apparatus illustrated in FIG. 2.

FIG. 9 is a flow chart illustrating an operation of decoding encoded data by the data processing apparatus illustrated in FIG. 2. Hereinafter, a decoding module of the data processing apparatus 100 and an operation thereof will be described in detail with reference to FIGS. 2 and 9.

Referring to FIGS. 2 and 9, the decoding module of the data processing apparatus 100 may include the data determining unit 160, the data decoding units 170 and 180, and the second output unit 190. The decoding module may decompress the encoded data dn' transmitted from the second memory 20, for example, the updated encoded data to generate decoded data Dn'.

When the encoded data dn' is transmitted from the second memory 20 to the data processing apparatus 100 (S210), the data determining unit 160 may determine a data component of the transmitted encoded data dn' (S220).

The data determining unit 160 may classify the encoded data dn' into low frequency region encoded data da' or high frequency region encoded data db' according to the determination result. The data determining unit 160 may classify the encoded data dn' into the low frequency region encoded data da' or the high frequency region encoded data db' according to flag bits, for example, the low frequency flag bit FL1 or a high frequency flag bit FL2, included in the encoded data dn' described above through FIGS. 6A through 8F.

The data decoding units 170 and 180 may include a low frequency decoding unit 180 and a high frequency decoding unit 170. The low frequency decoding unit 180 may include a bit dequantizing unit 181 and an interpolation unit 183. The low frequency decoding unit 180 may decompress the low frequency region encoded data da' classified by the data determining unit 160 and output the decoded data (S230).

FIGS. 10A through 10D are views illustrating an operation of a low frequency decoding unit according to an embodiment of the present disclosure.

Figure 10A:
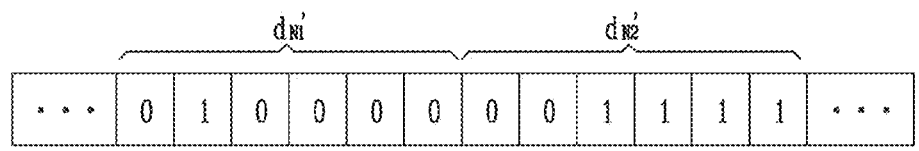
FIGS. 10A through 10D are views illustrating an operation of a low frequency decoding unit according to an embodiment of the present disclosure.

Referring to FIGS. 2, 9, and 10A through 10D, two encoded data $d_{N1}$' and $d_{N2}$' may be input from the second memory 20 to the data determining unit 160. The two encoded data $d_{N1}$' and $d_{N2}$' may be data of 010000 and 001111 as illustrated in FIG. 10A.

The data determining unit 160 may determine data components of the encoded data $d_{N1}$' and $d_{N2}$' from the flag bits of the two encoded data $d_{N1}$' and $d_{N2}$', that is, from the MSB values of the encoded data $d_{N1}$' and $d_{N2}$'. Here, since both of the flag bits of the two encoded data $d_{N1}$' and $d_{N2}$' are 0, the data determining unit 160 may classify the two encoded data $d_{N1}$' and $d_{N2}$' as low frequency region encoded data da1' and da2'.

The low frequency region encoded data da1' and da2' classified by the data determining unit 160 may be input to the bit dequantizing unit 181 of the low frequency decoding unit 180. The bit dequantizing unit 181 may dequantize the low frequency region encoded data da1' and da2' to generate representative values (S231).

Figure 10B:
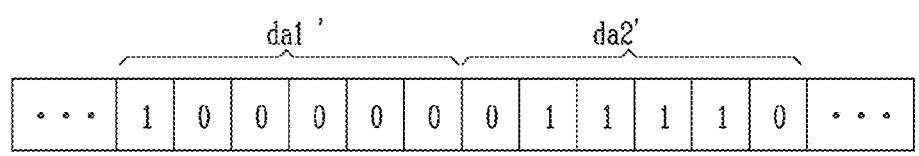
Figure 10C:
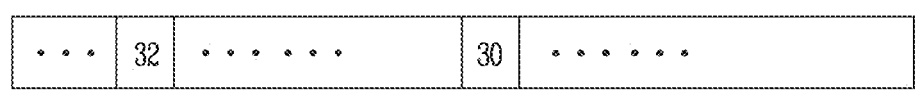

As illustrated in FIG. 10B, the bit dequantizing unit 181 may exclude the flag bit, that is, the MSB 0, from the first low frequency region encoded data da1' 010000 classified by the data determining unit 160, and add 0 to the rear end of the LSB to generate 6-bit data 100000. Subsequently, as illustrated in FIG. 10C, the bit dequantizing unit 181 may dequantize the generated 6-bit data to generate a representative value 32.

Similarly, the bit dequantizing unit 181 may exclude the flag bit 0 from the second low frequency region encoded data da2' 001111 classified by the data determining unit 160, and add 0 to the rear end of the LSB to generate 6-bit data 011110. Subsequently, the bit dequantizing unit 181 may dequantize the generated 6-bit data to generate an adjacent representative value 30.

The interpolation unit 183 may generate a plurality of intermediate values from the representative value and the adjacent representative value generated by the bit dequantizing unit 181 through interpolation. The interpolation unit 183 may generate low frequency decoded data Da' with respect to the first low frequency region encoded data da1' by using the representative value and the plurality of intermediate values (S233).

The interpolation unit 183 may generate seven intermediate values through interpolation. Thus, the interpolation unit 183 may generate low frequency decoded data Da' including M number of data blocks (M is a natural number), for example, eight data blocks b1 to b8, composed of data blocks of one representative value and seven intermediate values.

Figure 10D:
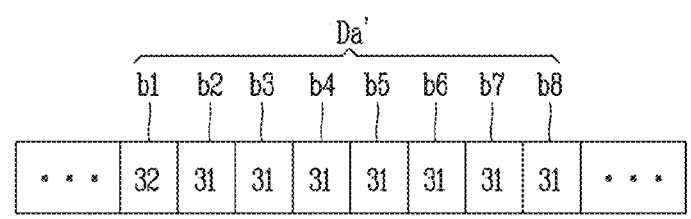

As illustrated in FIG. 10D, the interpolation unit 183 may generate seven intermediate values 31 from the representative value 32 and the adjacent representative value 30 generated by the bit dequantizing unit 181, through interpolation. Here, the intermediate values may be values between the representative value and the adjacent representative value.

Subsequently, the interpolation unit 183 may generate low frequency decoded data Da' 32, 31, 31, 31, 31, 31, 31, 31 including the eight blocks b1 to b8 using the one representative value 32 and the seven intermediate values 31. Here, the data blocks b1 to b8 of the low frequency decoded data Da' may be expressed as data of levels from 0 to 63.

Referring back to FIGS. 2 and 9, the high frequency decoding unit 170 may include a profile generating unit 171 and a vector dequantizing unit 173. The high frequency decoding unit 170 may decompose the high frequency region encoded data db' classified by the data determining unit 160 and output the same (S240).

FIGS. 11A through 11E are views illustrating an operation of a high frequency decoding unit according to an embodiment of the present disclosure, and FIGS. 12A through 12E are views illustrating an operation of a high frequency decoding unit according to another embodiment of the present disclosure.

Figure 11A:
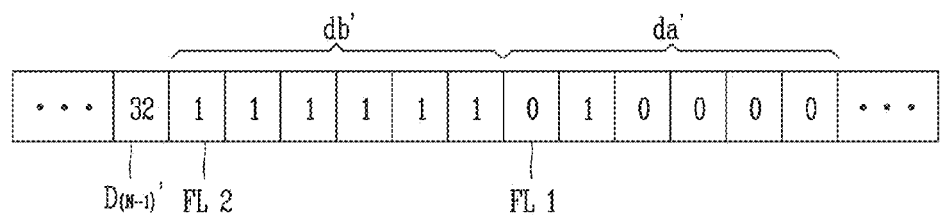
FIGS. 11A through 11E are views illustrating an operation of a high frequency decoding unit according to an embodiment of the present disclosure.

Referring to FIGS. 2, 9, and 11A through 11E, when two encoded data are input from the second memory 20 to the data determining unit 160, the data determining unit 160 may determine data components from flag bits of the two encoded data. The two encoded data may include data of 111111 and 010000 as illustrated in FIG. 11A. The data determining unit 160 may classify the first encoded data 111111 as high frequency encoded data db' and the second encoded data 010000 as low frequency region encoded data da'.

The profile generating unit 171 may determine an adjacent data component of the classified high frequency region encoded data db' (S241), and generate a base profile according to the results (S243).

The profile generating unit 171 may determine data components of data adjacent to the high frequency region encoded data db', for example, previous decomposed data $(D_{(N-1)}')$ and the subsequent encoded data da' of the high frequency region encoded data db' as illustrated in FIG. 11A. Here, since the previous decomposed data $(D_{(N-1)}')$ is 32 and the subsequent encoded data da' has a flag bit of 0, it may be known that data adjacent to the high frequency region encoded data db' are all data of a low frequency region.

Figure 11B:
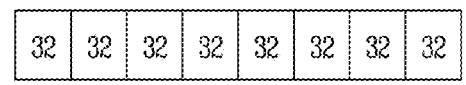
Figure 11C:
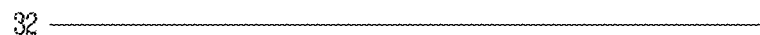

Thus, the profile generating unit 171 may generate a base vector having the data of the previous decoded data $(D_{(N-1)}')$, namely, 32, as a representative value as illustrated in FIG. 11B, and generate a base profile from the base vector as illustrated in FIG. 11C. Here, the base vector may be generated as eight data blocks each having data of level 32.

The base profile may be generated as a graph in which eight data having level 32 are connected.

Also, as illustrated in FIG. 12A, encoded data of 111101, 111111 may be input to the determining unit 160. Here, since flag bits of the two encoded data are all 1, the data determining unit 160 may classify both of the two encoded data as high frequency region encoded data db1' and db2'.

The profile generating unit 171 may determine data components of the adjacent data of the first high frequency region encoded data db1', for example, previous encoded data ($D_{(N-1)}$') and subsequent encoded data db2' of the first high frequency region encoded data db1', as illustrated in FIG. 12A. Here, since the previous encoded data ($D_{(N-1)}$') is 60 and the subsequent encoded data db2' is high frequency region data, it can be known that all the data adjacent to the first high frequency region encoded data db1' are data of a high frequency region.

Accordingly, the profile generating unit 171 may generate a base vector having a moving average value 34 as a representative value as illustrated in FIG. 12B, and generate a base profile from the base vector as illustrated in FIG. 12C. Here, the base vector may be generated as eight data blocks each having data of level 34. The base profile may be generated as a graph in which eight data each having level 34 are connected.

The moving average value may be an average value of previous decoded data decoded by the data decoding units 170 and 180 in a previous point in time, namely, before the first high frequency region encoded data db1' is decoded.

The vector dequantizing unit 173 may generate high frequency decoded data Db' from the base profile generated by the profile generating unit 171, through dequantization (S245).

The vector dequantizing unit 173 may detect one index corresponding to the high frequency region encoded data db' from a plurality of indices stored in the code book 150 described above. The vector dequantizing unit 173 may extract a vector profile corresponding to the index detected from the code book 150. The vector dequantizing unit 173 may generate high frequency decoded data Db' from the base profile and the extracted vector profile.

Figure 11D:

As illustrated in FIG. 11D, the vector dequantizing unit 173 may detect an index 31 corresponding to the high frequency region encoded data db', namely, 11111, from the plurality indices stored in the code book 150. The vector dequantizing unit 173 may detect an index corresponding to 5-bit data excluding the flag bit from the 6-bit high frequency region encoded data db', from the code book 150.

The vector dequantizing unit 173 may extract a vector profile corresponding to the index 31 detected from the code book 150. Here, the extracted vector profile is a graph in which seven data having level 0 and one data having level 1 are connected, and the data having level 31 may be positioned in a specific position, for example, in the third position among the eight data.

Figure 11E:
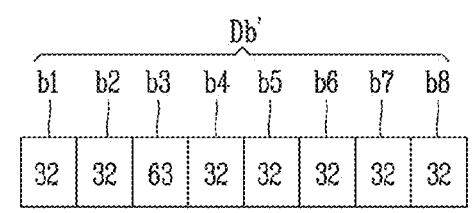

Subsequently, as illustrated in FIG. 11E, the vector dequantizing unit 173 may generate high frequency decoded data Db' including eight data blocks b1 to b8 using the base profile generated by the profile generating unit 171 and the vector profile extracted from the code book 150.

As described above, the base profile is generated with eight data each having level 32. The vector profile extracted from the code book 150 includes seven data having level 0 and one data having level 31. The vector dequantizing unit 173 may generate the high frequency decoded data Db' by adding the base profile and the vector profile.

The high frequency decoded data Db' generated by the vector dequantizing unit 173 may include eight data blocks b1 to b8 having levels 32, 32, 63, 32, 32, 32, 32, 32. Each of the data blocks b1 to b8 may be 6-bit data expressed by a decimal number, and thus, the high frequency decoded data Db' may include 48-bit data.

Also, as illustrated in FIG. 12D, the vector dequantizing unit 173 may detect an index 29 corresponding to the high frequency region encoded data db' 11101 excluding the flag bit from the plurality of indices stored in the code book 150.

The vector dequantizing unit 173 may extract a vector profile corresponding to index 29 detected from the code book 150. The extracted vector profile may be a graph in which seven data having level 0 and one data having level 29 are connected, and the data having level 29 may be positioned in the end of the eight data.

As illustrated in FIG. 12E, the vector dequantizing unit 173 may generate high frequency decoded data Db' including eight data blocks b1 to b8 by adding the base profile generated by the profile generating unit 171 and the vector profile detected from the code book.

The base profile is generated as eight data having level 34. The vector profile detected from the code book 150 includes seven data having level 0 and one data having level 29. The vector dequantizing unit 173 may generate high frequency decoded data Db' including eight data blocks b1 to b8 having level 34, 34, 34, 34, 34, 34, 34, 63 by adding the base profile and the vector profile. Each of the data blocks b1 to b8 of the high frequency decoded data Db' may be 6-bit data expressed by a decimal number, and thus, the high frequency decoded data Db' may include 48-bit data.

That is, the decoding module of the data processing apparatus 100 may classify the 6-bit encoded data dn' input from the second memory 20 according to data components, and decompress the same through the low frequency decoding unit 180 or the high frequency decoding unit 170 to generate 48-bit decoded data, for example, low frequency decoded data Da' or high frequency decoded data Db'.

At least one of the low frequency decoded data Da' and the high frequency decoded data Db' may be output from the second output unit 190 to the first memory 10, updated to compensation data Dn, and stored (S250).

As described above, the data processing apparatus 100 according to an embodiment of the present disclosure decompresses encoded data dn' by selecting one of low frequency decoding and high frequency decoding according to data components of the encoded data dn', thereby performing data decoding without losing a high frequency component included in the original compensation data Dn.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A data processing apparatus coupled between a first memory and a second memory, comprising:
a data encoder coupled between the first memory and the second memory, the data encoder configured to:
receive mobility compensation data from the first memory, the mobility compensation data to compensate for non-uniformity of mobility of a transistor of a display device,
encode the mobility compensation data according to difference values of the mobility compensation data, each of the difference values being a difference between two corresponding adjacent values of the mobility compensation data, and
transmit the encoded mobility compensation data to the second memory.

2. The data processing apparatus of claim 1, wherein the data encoder comprises:
a frequency classifier coupled between the first memory and the second memory, the frequency classifier configured to:
classify the mobility compensation data into first compensation data and second compensation data according to the difference values,
generate a first flag bit responsive to classifying the mobility compensation data into the first compensation data having the difference values below a threshold value, and
generate a second flag bit responsive to classifying the mobility compensation data into the second compensation data having the difference values above the threshold value;
a low frequency encoder coupled between the frequency classifier and the second memory, the low frequency encoder configured to encode the first compensation data according to the first flag bit to generate first encoded data;
a high frequency encoder coupled between the frequency classifier and the second memory in parallel with the low frequency encoder, the high frequency encoder configured to encode the second compensation data according to the second flag bit to generate second encoded data; and
an output interface coupled between the low frequency encoder and the second memory and coupled between the high frequency encoder and the second memory, the output interface configured to output at least one of the first encoded data and the second encoded data, as the encoded data to the second memory.

3. The data processing apparatus of claim 2, wherein the low frequency encoder comprises:
a sampler coupled to the frequency classifier, the sampler configured to obtain a representative value, based on which the first compensation data is encoded, and generate intermediate data based on the representative value; and
a bit quantizer coupled between the sampler and the output interface, the bit quantizer configured to quantize the intermediate data to N (N is a natural number)-bit data and insert the first flag bit into the N-bit data to generate the first encoded data.

4. The data processing apparatus of claim 3, wherein the bit quantizer is configured to remove a least significant bit of the N-bit data, and to insert the first flag bit to a front of a most significant bit of the N-bit data.

5. The data processing apparatus of claim 2, further comprising:
a code book configured to store a plurality of vector profiles and a plurality of indices corresponding to the plurality of vector profiles,
wherein the high frequency encoder comprises:
a representative vector generator coupled to the frequency classifier, the representative vector generator configured to generate a representative vector based on a representative value of the second compensation data, the representative value based on which the second compensation data is encoded, and generate a representative vector profile based on the representative vector; and
a vector quantizer coupled between the representative vector generator and the output interface, the vector quantizer configured to extract an index of one vector profile corresponding to the representative vector profile from the code book, generate N-bit data based on the plurality of indices, and replace at least one bit of the N-bit data with the second flag bit to generate the second encoded data.

6. The data processing apparatus of claim 5, wherein the representative vector generator is configured to generate intermediate data by extracting the representative value, and to generate the representative vector according to differences between the second compensation data and the intermediate data.

7. The data processing apparatus of claim 5, wherein the representative vector generator is configured to extract the representative value from the second compensation data according to a position of high frequency data included in the second compensation data determined based on the difference values, or to extract a moving average value as the representative value.

8. The data processing apparatus of claim 7, wherein the moving average value is an average value of a plurality of previous data encoded by the data encoder.

9. The data processing apparatus of claim 5, wherein the vector quantizer is configured to replace a most significant bit of the N-bit data with the second flag bit.

10. The display processing apparatus of claim 1, wherein the transistor is a driving transistor for driving an organic light emitting diode of the display device, and wherein the mobility compensation data include information for compensating for the non-uniformity of the mobility due to degradation of the driving transistor.

11. A data processing apparatus coupled between a first memory and a second memory, comprising:
a data decoder coupled between the first memory and the second memory, the data decoder configured to:
receive updated encoded mobility compensation data from the second memory, the updated encoded mobility compensation data being updated after compensating for non-uniformity of mobility of a transistor of a display device,
decode the updated encoded mobility compensation data according to a flag bit of the updated encoded mobility compensation data, the flag bit indicating whether the decoded mobility compensation data has any difference value of difference values above a threshold value, each of the difference values being a difference between two corresponding adjacent values of the decoded mobility compensation data, and transmit the decoded mobility compensation data to the first memory.

12. The data processing apparatus of claim 11, wherein the data decoder comprises:
a data classifier coupled between the second memory and the first memory, the data classifier configured to classify the updated encoded mobility compensation data into first encoded data and second encoded data according to the flag bit of the updated encoded mobility compensation data;
a low frequency decoder coupled between the data classifier and the first memory, the low frequency decoder configured to decode the first encoded data to generate first decoded data;
a high frequency decoder coupled between the data classifier and the first memory in parallel with the low frequency decoder, the high frequency decoder configured to decode the second encoded data to generate second decoded data; and
an output interface coupled between the low frequency decoder and the first memory and coupled between the high frequency decoder and the first memory, the output interface configured to output at least one of the first decoded data and the second decoded data, as the decoded data to the first memory.

13. The data processing apparatus of claim 12, wherein the low frequency decoder comprises:
a bit dequantizer coupled to the data classifier, the bit dequantizer configured to add 1-bit data to the first encoded data and generate a representative value, based on which the first encoded data is decoded, through dequantization of the first encoded data; and
an interpolator coupled between the bit dequantizer and the output interface, the interpolator configured to generate the first decoded data having M (M is a natural number) number of data blocks through interpolation between the representative value and an adjacent representative value adjacent to the representative value.

14. The data processing apparatus of claim 13, wherein the bit dequantizer is configured to remove the flag bit from the first encoded data and to insert 0 to an end of a least significant bit of the first encoded data.

15. The data processing apparatus of claim 13, wherein the interpolator is configured to generate (M−1) number of intermediate values between the representative value and the adjacent representative value, and to generate the first decoded data based on the representative value and the (M−1) number of intermediate values.

16. The data processing apparatus of claim 12, further comprising:
a code book configured to store a plurality of vector profiles and a plurality of indices corresponding to the plurality of vector profiles, wherein the high frequency decoder comprises:
a profile generator coupled to the data classifier, the profile generator configured to extract a representative value, based on which the second encoded data is decoded, and generate a base profile based on the representative value, and
a vector dequantizer coupled between the profile generator and the output interface, the vector dequantizer configured to extract a vector profile of one index corresponding to the second encoded data from the code book, and add the base profile and the vector profile to generate the second decoded data having M number of data blocks.

17. The data processing apparatus of claim 16, wherein the profile generator is configured to extract the representative value from the second encoded data according to data adjacent to the second encoded data, or to extract a moving average value as the representative value.

18. The data processing apparatus of claim 17, wherein the moving average value is an average value of a plurality of previous decoded data decoded by the data decoder.

19. A display device comprising:
a first memory storing mobility compensation data to compensate for non-uniformity of mobility of a transistor of the display device;
a data encoder coupled between the first memory, the data encoder configured to encode the mobility compensation data from the first memory according to difference values of the mobility compensation data, each of the difference values being a difference between two corresponding adjacent values of the mobility compensation data; and
a mobility compensation circuit coupled to the data encoder and comprising a second memory storing the encoded mobility compensation data, the mobility compensation circuit configured to compensate for the non-uniformity of the mobility of the transistor based on the encoded mobility compensation data.

20. The display device of claim 19, wherein the mobility compensation circuit is further configured to generate an updated encoded mobility compensation data after compensating for the non-uniformity of the mobility of the transistor, the display device further comprising:
a data decoder coupled between the first memory and the second memory, the data decoder configured to decode the updated encoded mobility compensation data according to a flag bit of the updated encoded mobility compensation data, the flag bit indicating whether the decoded mobility compensation data has any difference value of the difference values above a threshold value.

* * * * *